United States Patent Office 3,257,454
Patented June 21, 1966

3,257,454
PREPARATION OF ACRYLAMIDE
William A. Heckle, Texas City, Tex., assignor to Monsanto Company, a corporation of Delaware
No Drawing. Filed May 10, 1963, Ser. No. 279,593
3 Claims. (Cl. 260—561)

This invention relates to an improved process for producing acrylamide by hydration of acrylonitrile.

With the ever-expanding emphasis on commercial production and exploitation of synthetic polymers for use in many technological areas, increased interest has been developed in the production of acrylamide. This compound and its polymers and copolymers have many potential applications in the fields of plastics, adhesives, fibers, surface coatings, plasticizers, soil conditioners, and thickening agents as well as in the leather, paper, rubber, textile and photographic arts. Thus, improved processes for the preparation of this relatively valuable monomer are always in demand.

It is well known that acrylamide can be prepared by hydration of acrylonitrile with concentrated sulfuric acid. The resulting product is acrylamide sulfate which is then further treated to isolate the free amide. The various procedures proposed for this purpose generally involve neutralization of the aqueous acrylamide sulfate solution with an alkaline material such as ammonia or an alkali metal or an alkaline earth metal hydroxide, carbonate or the like. In these methods, however, there is a concomitant production of neutral salts as by-products and these are of little if any value from a commercial or marketable standpoint. The advantages of a process wherein such neutralization can be eliminated and which provides for continual re-use of the sulfuric acid reactant is readily apparent.

According to the present process such disadvantages of the pior art as outlined above are obviated by first reacting acrylonitrile, water and sulfuric acid to produce acrylamide sulfate, employing said sulfate as a catalyst in the hydration of acrylonitrile, separating the acrylamide formed from the hydration reaction mixture by extracting it with a suitable solvent, reusing the acrylamide sulfate catalyst for hydrating more acrylonitrile and recovering acrylamide from the solvent solution thereof.

The acrylamide sulfate catalyst is readily prepared by the hydration of acrylonitrile with sulfuric acid monohydrate. Approximately equimolecular proportions of the sulfuric acid monohydrate and nitrile are employed. However, the sulfuric acid monohydrate can be used in slightly over equal molecular proportions with relation to the nitrile if desired. Thus, for each mole of the nitrile there can be used slightly over one mole of sulfuric acid such as between about one and about two and preferably between about 1.1 and 1.5 moles. Likewise, slightly over one mole of water and preferably from about 1.1 to about 1.5 moles of water can be used per mole of nitrile.

The initial hydration reaction as carried out at a suitable temperature and for a sufficient length of time to effect substantially complete conversion to the amide sulfate. In the preferred embodiment of the invention, this first step is conducted at temperatures from about 40° to about 100° C. and preferably from about 80° to about 95° C. The time required for the reaction varies with the temperature. At the higher temperatures shorter reaction times are required while at the lower temperatures reaction times are longer. Generally over the broad temperature range disclosed, reaction times from about 0.5 hour to about five hours are satisfactory. When operating within the preferred temperature range, a reaction time of from about one to about two hours provides for substantially complete hydration.

The use of a polymerization inhibitor during the formation of acrylamide sulfate is desirable. Suitable inhibitors which can be used include organic compounds such as hydroquinone, phenothiazine, quinone, butylated hydroxyanisole, tetramethylthiuram monosulfide, and the like. Also useful in preventing polymerization in the system are inorganic materials such as copper, copper sulfate, sulfur, alkali metal nitrites such as sodium and potassium nitrite, and the like which are readily compatible with the reaction mixture.

The product resulting from the initial hydration reaction is an aqueous solution or dispersion of the amide sulfate which is suitable for use as such as a catalyst for the hydration of acrylonitrile to acrylamide. Acrylonitrile is added to a quantity of the acrylamide sulfate in a suitable reactor and water is added in small increments while the mixture is stirred and maintained at a suitable temperature over a suitable reaction period. In this step, the molecular proportions of the reactants are carefully controlled. For optimum yields, approximately 0.4 mole of nitrile and 0.25 mole of water are added for each mole of acrylamide sulfate employed. Mole proportions of acrylonitrile to water to acrylamide sulfate in the range from about 0.25:0.15:1 to 1:1:1, however, can be used but yields are lower with certain of these reactant ratios because of the formation of acrylic acid.

The formation of acrylic acid as a by-product is minimized when smaller proportions of acrylonitrile and water are employed and when water concentration is kept at a low level by addition in small increments during the reaction period. However, the simultaneous addition of the acrylamide sulfate catalyst and reactants is not precluded.

The hydration reaction catalyzed by acrylamide sulfate is conducted at temperatures from about 75° to about 100° C. and preferably from about 90° to 100° C. As in the first step, shorter reaction times are required at the upper end of the temperature range and longer ones at the lower end. Generally, reaction times from about one to about four hours gives satisfactory results. At the preferred temperatures, substantially complete hydration can be effected in from about 2 to about 2.5 hours.

Acrylamide is recovered from the acrylamide sulfate catalyst mixture by solvent extraction using an organic compound which is a solvent for the amide but is substantially a non-solvent for the amide sulfate and then cooling the solution to a temperature sufficiently low to crystallize out the amide or by evaporating or distilling off the solvent under mild conditions, for example, in vacuo or by spray drying. Suitable solvents include nitriles such as acetonitrile, acrylonitrile, and the like; saturated hydrocarbons such as n-hexane, n-octane, n-decane and the like; aromatic hydrocarbons such as benzene, toluene, xylene and the like; chlorinated hydrocarbons such as dichloromethane, chloroform, trichloroethylene, perchloroethylene and the like.

The solvent extraction treatment may be conducted in any of several conventional ways. It may be carried out either discontinuously by extracting the acrylamide from the reaction mixture by successive charges of fresh solvent or continuously by countercurrent flow in a known type of liquid-liquid extraction column or in a series of mixers and settlers.

The temperature at which the extraction is carried out will vary with the particular solvent employed. Generally, the operation is conducted as close to ambient temperatures as is practical to avoid undue polymerization of the amide. Also to alleviate losses due to polymerization, a polymerization inhibitor can be employed

EXAMPLE

Preparation of catalyst

Acrylamide sulfate was prepared in a three-necked flask equipped with a stirrer, thermometer, dropping funnel with a pressure equalizing arm, and an ice-water condenser having attached at the exit thereof a Schwartz tube filled with mercury. Approximately 116 g. (1 mole) of sulfuric acid monohydrate and 0.1 g. of phenothiazine to inhibit polymerization was charged to the flask. This charge was heated to 95° C. with stirring. Then 55.6 g. (1.05 moles) of acrylonitrile was added dropwise over a 15- to 20-minute period while the temperature was maintained at 95–100° C. by occasional use of an ice bath. The reaction mixture was then heated with continual stirring at 95° C. for an additional 40 to 45 minutes to insure completion of reaction. Analysis of a sample of the reaction mixture at the end of this time showed it to contain about 97% pure acrylamide sulfate.

Catalytic hydration of acrylonitrile to acrylamide

Several runs were made in which acrylonitrile was hydrated in the presence of acrylamide sulfate as the catalyst. Approximately one mole of acrylamide sulfate prepared as described directly above was cooled to 78° C. and a predetermined amount of acrylonitrile was added to it followed by a predetermined amount of water. In all but one of the runs (Run No. 9), the water was added dropwise over the entire 2-hr. reaction period or during the first 80 or 90 minutes of the 2-hr. reaction period. The temperature was adjusted to the level at which the acrylonitrile would just reflux or to provide a maximum reaction temperature of 100° C.

At the end of the reaction period, the stirring was discontinued and the condenser and dropping funnel were quickly replaced with a ground glass take-off tube fitted to a three-necked flask. The take-off tube was attached to a vacuum pump through a cold trap set in Dry Ice. With the reaction flask under vacuum (5 mm. Hg) the reaction mixture was stirred while the temperature was maintained at 90–95° C. to flash off unreacted acrylonitrile, water, and any acrylic acid formed. No evidence of sublimation of acrylamide was observed during this step. The stripping operation required about 30 minutes after which the reaction flask was brought to atmospheric pressure and its contents weighed and analyzed to determine the total amount of acrylamide present. Yield data were then calculated from this information. Results of the several runs together with the conditions under which they were obtained are presented below.

| Run No. | Feed Acrylonitrile (Moles) | Water (Moles) | Temp., °C. | Once-through Yield, Percent |
|---|---|---|---|---|
| 9 | 1.0 | 0.5 | 79 | 23 |
| 11 | 1.0 | 0.5 | 79–80 | 31 |
| 12E | 0.4 | 0.24 | 90–100 | 75 |
| 12F | 0.4 | 0.25 | 90–100 | 73 |

Recovery of acrylamide from catalytic hydration reaction mixture

To the reaction mixture from the catalytic hydration step which is a viscous liquid there is added a sufficient amount of acrylonitrile as a solvent to convert the mixture to a free-flowing liquid. The resulting liquid is fed continuously into a liquid-liquid extraction column filled with glass rings at an intermediate point thereof. Simultaneously, acrylonitrile is introduced into the lower part of the column and flows upwardly therein. Reflux is provided in the upper part of the column by feeding a liquid stream rich in acrylamide near the top thereof. This may be a stream obtained from the crystallizer used later in the system to recover the solid acrylamide product from the solution. A solution of acrylamide in acrylonitrile is withdrawn continuously from the top of the column while acrylamide sulfate is withdrawn from the bottom of the column. The overhead from the extraction column is charged to a continuous vacuum crystallizer where the acrylamide is crystallized out and withdrawn as a slurry. Mother liquor from the crystallizer is recycled to the extractor as indicated above to provide reflux in the upper half of this column or, if desired, may be recycled with the incoming charge to the crystallizer. The crystalline slurry is charged to a centrifuge to separate the remaining solvent from the crystalline acrylamide of high purity which is then dried in any suitable apparatus. The solvent recovered from the centrifuge is returned to the extraction column for re-use. The acrylamide sulfate is recycled from the bottom of the extraction column for re-use as the catalyst in the hydration of acrylonitrile to produce more acrylamide.

What is claimed is:

1. The method of producing acrylamide which comprises the steps of (1) adding acrylonitrile and water to acrylamide sulfate in such amounts that the molecular ratio of acrylonitrile to water to acrylamide sulfate is in the range from about 0.25:0.15:1 to about 1:1:1 and maintaining said mixture at a temperature from about 75° C. to about 100° C. for a period of time from about one to about four hours; (2) extracting acrylamide from the resulting mixture with a solvent chosen from the group consisting of nitriles, aromatic hydrocarbons, and chlorinated hydrocarbons; and (3) recovering acrylamide from said solvent mixture thereof.

2. The method of producing acrylamide which comprises the steps of (1) adding acrylonitrile and water to acrylamide sulfate in amounts such that 0.4 mole of acrylonitrile and 0.25 mole of water is present for each mole of acrylamide sulfate and maintaining the resulting mixture at a temperature from about 90° C. to about 100° C. for a period of time from about two to about 2.5 hours; (2) extracting acrylamide from the reaction mixture with acrylonitrile and recycling the acrylamide sulfate to step (1); and (3) recovering acrylamide from the solution thereof.

3. The process of claim 2 wherein the water added in step (1) is introduced in small increments throughout the reaction period.

References Cited by the Examiner

UNITED STATES PATENTS 2,628,977 2/1953 Grigsby _____ 260—561
2,683,173 7/1954 Weisgerber _____ 260—561

WALTER A. MODANCE, *Primary Examiner.*

NICHOLAS S. RIZZO, *Examiner.*

ROBERT PRICE, N. TROUSOF, *Assistant Examiners.*